Patented May 29, 1951

2,554,533

UNITED STATES PATENT OFFICE 2,554,533

BROMO-TRICHLORO BUTENYL ACETATE

Elbert C. Ladd, Passaic, N. J., assignor to United States Rubber Company, New York, N. Y., a corporation of New Jersey No Drawing. Application February 8, 1949, Serial No. 75,289

1 Claim. (Cl. 260—488)

This invention relates to 4,4,4-trichloro-2-bromo-2-butenols and their ethers and esters, a novel group of compounds having the type formula $$Cl_3C—CH=CBr—CHR—O—R'$$

wherein R is a radical selected from the class of hydrogen and lower alkyl (e. g., methyl, ethyl, propyl, isopropyl, butyl) and R' is a radical selected from the class of hydrogen, alkyl (e. g., methyl, ethyl, propyl, butyl, isobutyl, amyl, hexyl, cyclohexyl, heptyl, octyl, nonyl, decyl), aryl (e. g., phenyl, tolyl, xylyl, p-methoxyphenyl, p-chlorophenyl, naphthyl), and acyl groups devoid of ethylenic and acetylenic unsaturation (e. g., acetyl, propionyl, butyryl, benzoyl, phenacetyl, ethanephosphonyl, benzenephosphonyl and benzenesulfonyl).

Such compounds are readily prepared by the free-radical-catalyzed reactions of bromotrichloromethane with 2-propynyl alcohols, ethers and esters of the type formula $$HC≡CH—CHR—O—R'$$

as illustrated below:

(1) $CBrCl_3 + HC≡CH—CH_2—OH →$
$Cl_3C—CH=CBr—CH_2—OH$ (2) $CBrCl_3 + HC≡C—CH_2—O—C_2H_5 →$
$Cl_3C—CH=CBr—CH_2—O—C_2H_5$ (3) $CBrCl_3 + HC≡C—CH_2—O—C_6H_4Cl →$
$Cl_3C—CH=CBr—CH_2—O—C_6H_4Cl$ (4) $CBrCl_3 + HC≡C—CH_2—O—C_6H_4—CN →$
$Cl_3C—CH=CBr—CH_2—O—C_6H_4—CN$ (5) $CBrCl_3 + HC≡C—CH_2—O—CO—CH_3 →$
$Cl_3C—CH=CBr—CH_2—O—CO—CH_3$ (6) $CBrCl_3 + HC≡C—CH_2—$
$O—CO—CH_2—C_6H_5 → Cl_3C—CH=$
$CBr—CH_2—O—CO—CH_2—C_6H_5$ (7) $CBrCl_3 + HC≡C—CH_2—O—CO—CH_2Cl →$
$Cl_3C—CH=CBr—CH_2—O—CO—CH_2Cl$ (8) $CBrCl_3 + HC≡C—CH_2—$
$O—PO(OC_2H_5)—C_6H_5 → Cl_3C—CH=$
$CBr—CH_2—O—PO(OC_2H_5)—C_6H_5$ (9) $CBrCl_3 + HC≡C—CH_2—O—SO_2—C_6H_5 →$
$Cl_3C—CH=CBr—CH_2—O—SO_2—C_6H_5$

Such compounds are useful as plasticizers, and in the synthesis of polymerizable monomers, pharmaceuticals and organic intermediates. For example, they readily undergo hydrolysis, hydrogenation, halogenation and dehydrohalogenation to yield a wide variety of novel and useful compounds.

In the practice of my invention the bromotrichloromethane and the acetylenic compound are heated together in molar ratios of from 1:10 to 20:1 and particularly from 1:1 to 10:1. The reaction is normally completed within 0.2–24 hours and proceeds readily at temperatures in the range of 25–200° C., usually 50–130° C. The reactants can be mixed initially or incrementally during the reaction.

The reaction is promoted by a source of free radicals such as that provided by irradiation with ultra-violet light or by the presence of from about 0.1 to 10.0% by weight (based on the reactants) of a compound capable of undergoing thermal decomposition to yield free radicals. Such compounds include metal alkyls (e. g., sodium methyl, potassium ethyl, lead tetraethyl, sodium amyl), peroxidic compounds (e. g., hydrogen peroxide, benzoyl peroxide, acetyl peroxide, tertiary-butyl hydrogen peroxide), and alpha,alpha' - azobis-(alpha-alkylalkanoic) acids and derivatives hydrolyzable thereto (e. g., alpha,alpha'-azobis(isobutyronitrile), alpha,alpha' - azobis(isobutyric) acid, dimethyl alpha,alpha' - azobis(isobutyrate), and alpha,alpha' - azobis(alpha - ethylbutyronitrile)).

At the conclusion of the reaction, the product is isolated and purified by preferential extraction, fractional distillation or crystallization.

The following example discloses my invention in more detail.

*Example*

In the course of 1 hour, a mixture of 49 g. of propargyl acetate and 1.5 g. of alpha,alpha'-azobis-(isobutyronitrile) is added dropwise to a refluxing mixture of 198 g. of bromotrichloromethane, and 65 g. of chloroform. When admixture is complete, refluxing is continued for an additional 0.5 hour, after which the reaction mixture is fractionally distilled to yield 44 g. of the new compound 2-bromo - 4,4,4 - trichloro-2-butenyl acetate, b. 86–89.5° C./0.6 mm.; $n_D^{20}$ 1.5239; per cent total halogen as chlorine= 47.88% (theory=47.85%).

Having thus described my invention, what I claim and desire to protect by Letters Patent is:

2-bromo-4,4,4-trichloro-2-butenyl acetate.

ELBERT C. LADD.

No references cited.